US007263038B2

(12) United States Patent
Tsukahara (10) Patent No.: US 7,263,038 B2
(45) Date of Patent: Aug. 28, 2007

(54) DATA REPRODUCTION APPARATUS AND DATA REPRODUCTION METHOD

(75) Inventor: Yasunori Tsukahara, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 736 days.

(21) Appl. No.: 10/699,872

(22) Filed: Nov. 4, 2003

(65) Prior Publication Data

US 2004/0125705 A1 Jul. 1, 2004

(30) Foreign Application Priority Data

Dec. 26, 2002 (JP) ............... 2002-378644

(51) Int. Cl.
*G11B 7/085* (2006.01)
(52) U.S. Cl. ............... 369/30.09; 369/30.06; 369/30.08
(58) Field of Classification Search ............ 369/30.09, 369/30.06, 30.07, 30.08, 47.1, 47.11, 47.12, 369/53.11, 53.21, 13.02; 386/95, 125, 126
See application file for complete search history.

(56) References Cited

U.S. PATENT DOCUMENTS

| 6,421,499 | B1 | 7/2002 | Kim et al. | |
| 2002/0045960 | A1 | 4/2002 | Phillips et al. | |
| 2004/0022155 | A1* | 2/2004 | Oshima | 369/53.21 |

FOREIGN PATENT DOCUMENTS

| EP | 1 311 121 A1 | 5/2003 |
| JP | 03-144947 | 6/1991 |
| JP | 03-215783 | 9/1991 |
| JP | 04-176044 | 6/1992 |
| JP | 11-213627 | 8/1999 |
| JP | 2001-167559 | 6/2001 |
| JP | 2001-266457 | 9/2001 |
| JP | 2001-266459 | 9/2001 |
| JP | 2002-23771 | 1/2002 |
| JP | 2002-84495 | 3/2002 |
| JP | 2002-150750 | 5/2002 |
| JP | 2002-313070 | 10/2002 |
| JP | 2002-354425 | 12/2002 |
| JP | 2003-178088 | 6/2003 |
| WO | WO 01/67753 A1 | 9/2001 |
| WO | WO 02/01868 A1 | 1/2002 |
| WO | WO 03/058625 A1 | 7/2003 |

OTHER PUBLICATIONS

Japanese Office Action dated Jun. 28, 2005 for Appln. No. 2002-378644.
Search Report, dated Apr. 16, 2004, from the European Patent Office for Patent Application No. 03025025.2-2223-.

* cited by examiner

*Primary Examiner*—Ali Neyzari
(74) *Attorney, Agent, or Firm*—Pillsbury Winthrop Shaw Pittman, LLP (57) ABSTRACT

The present invention includes a condition setting portion configured to set a condition used to select titles to be registered in a play list among a plurality of titles recorded on a recording medium, a retrieval portion configured to retrieve titles corresponding to a set condition by making reference to management information recorded on the recording medium, and a registration portion configured to register retrieved titles in the play list.

10 Claims, 6 Drawing Sheets

DATA REPRODUCTION APPARATUS AND DATA REPRODUCTION METHOD

CROSS-REFERENCE TO RELATED APPLICATIONS

This application is based upon and claims the benefit of priority from the prior Japanese Patent Application No. 2002-378644, filed Dec. 26, 2002, the entire contents of which are incorporated herein by reference.

BACKGROUND OF THE INVENTION

1. Field of the Invention

The present invention relates to a data reproduction apparatus and a data reproduction method which read recorded data from a recording medium, e.g., a DVD (Digital Versatile Disk) and reproduce the data, and more particularly to an apparatus and a method which facilitate play list editing operation.

2. Description of the Related Art

As is well known, the above-described data reproduction apparatus is provided with a so-called play list reproduction function which automatically reproduces preset titles in a predetermined order among a plurality of titles recorded on an optical disk.

When performing this play list reproduction, there is required a play list editing operation which selects titles to be registered in a play list from a plurality of titles recorded on an optical disk.

As this play list editing operation, there is a technique to select required titles while grasping the content of each title by reproducing an optical disk, and a technique to select required titles while making reference to management information of individual titles.

In short, when performing the play list editing, there is required an operation to reproduce titles recorded on an optical disk or an operation to make reference to management information of titles.

In such a play list editing operation, however, when the number of titles recorded on the optical disk is increased, there occurs a problem that the operation to select required titles becomes troublesome and handling is inconvenient for users.

Further, when the title selection operation becomes troublesome in this way, there also occurs an inconvenience that a title which should be selected is passed over and a requested title is not registered in a play list.

It is to be noted that Jpn. Pat. Appln. KOKAI Publication No. 2001-167559 discloses a structure which is a method for adding information of a video object determining a difference value between recording time information and display start time information as identification information, and which can specify a video object without being affected by deletion of time information.

Furthermore, Jpn. Pat. Appln. KOKAI Publication No. 2002-150750 discloses a structure which controls a reserved recording operation based on information concerning recording reservation and information indicating whether this information is valid or invalid.

Moreover, Jpn. Pat. Appln. KOKAI Publication No. 2002-84495 discloses a structure which changes original management information of a video stream recorded on a recording medium into new management information based on editing information input by a user.

However, these publications do not mention facilitation of an operation to select titles to be registered in a play list from a plurality of titles recorded on an optical disk.

BRIEF SUMMARY OF THE INVENTION

According to one aspect of the present invention, there is provided a data reproduction apparatus comprising: a condition setting portion configured to set a condition used to select titles to be registered in a play list; a retrieval portion configured to retrieve titles corresponding to the condition set by the condition setting portion by making reference to management information recorded on the recording medium; and a registration portion configured to register the titles retrieved by the retrieval portion in the play list.

According to one aspect of the present invention, there is provided a data reproduction method comprising: setting a condition used to select titles to be registered in a play list among a plurality of titles recorded on a recording medium; retrieving titles corresponding to the set condition by making reference to management information recorded on the recording medium; and registering the retrieved titles in the play list.

DETAILED DESCRIPTION OF THE INVENTION

Figure 1:
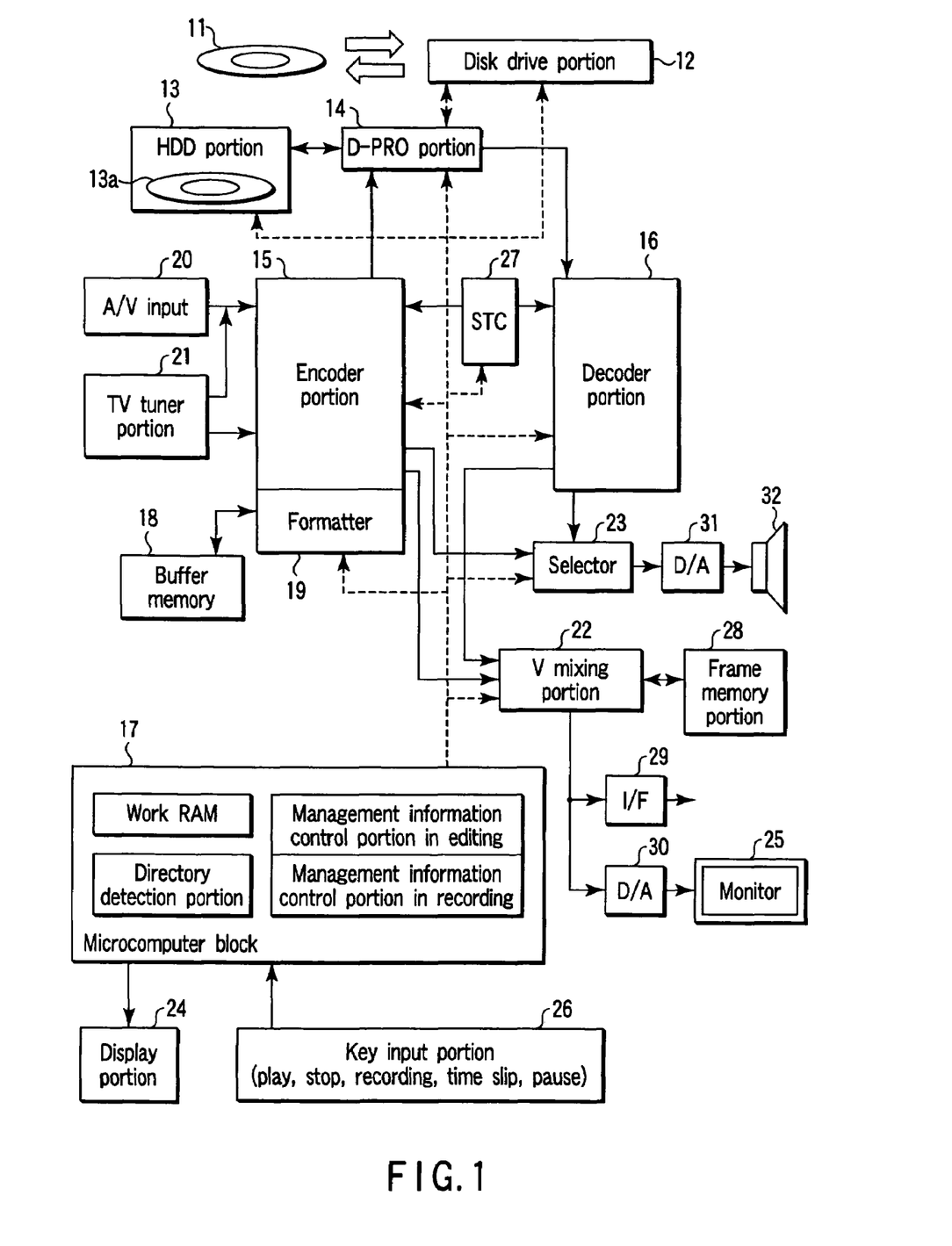
FIG. 1 is a block diagram showing an embodiment according to the present invention, which illustrates a data recording/reproducing apparatus.

An embodiment according to the present invention will now be described in detail hereinafter with reference to the accompanying drawings. FIG. 1 shows a data recording/reproducing apparatus which will be described in connection with this embodiment. This data recording/reproducing apparatus can process both a DVD-RAM (Random Access Memory) and a hard disk as a recording medium but, e.g., a semiconductor memory can also be used as a recording medium.

That is, in the data recording/reproducing apparatus depicted in FIG. 1, roughly, a main block on a recording side exists on the left side in the drawing, a main block on a reproduction side exists on the right side in the drawing, and a main block on a control side exists on the lower side in the drawing.

Additionally, this data recording/reproducing apparatus has two types of disk drive portions. First, it has a disk drive portion 12 which drives to rotate an optical disk 11 which is a first medium as an information recording medium which can constitute a video file, and executes reading/writing of information. Further, this data recording/reproducing apparatus has a hard disk drive portion 13 which drives a hard disk 13a as a second medium.

A data processor portion 14 can supply recording data to the disk drive portion 12 and the hard disk drive portion 13, and receive a signal reproduced by the disk drive portion 12 or the hard disk drive portion 13.

The disk drive portion 12 has a rotation control system with respect to the optical disk 11, a laser drive system, an optical system and others. The data processor portion 14 deals with data in recording or reproduction unit, and includes a buffer circuit, a modulation/demodulation circuit, an error correction portion and others.

Furthermore, this data recording/reproducing apparatus has as main constituent elements an encoder portion 15 which constitutes the recording side, a decoder portion 16 which constitutes the reproduction side, and a microcomputer block 17 which controls an operation of an apparatus main body.

The encoder portion 15 includes a video and audio analog digital converter which digitalizes an analog video signal and an analog audio signal input thereto, a video encoder, and an audio encoder. Moreover, it also includes a sub-video encoder.

An output from the encoder portion 15 is converted into a predetermined DVD-RAM format by a formatter 19 including a buffer memory 18, and supplied to the data processor portion 14.

To the encoder portion 15 are input an external analog video signal and an external analog audio signal obtained from an A/V (Audio Video) input portion 20, or an analog video signal and an analog audio signal obtained from a TV (Television) tuner portion 21.

It is to be noted that, when compressed digital video signal and digital audio signal are directly input to the encoder portion 15, the encoder portion 15 can directly supply the compressed digital video signal and digital audio signal to the formatter 19. Additionally, the encoder portion 15 can directly supply analog-to-digital-converted digital video signal and audio signal to a V (Video) mixing portion 22 and an audio selector 23.

In the video encoder included in the encoder portion 15, the digital video signal is converted into a digital video signal compressed by using a variable bit rate based on the MPEG (Moving Picture Experts Group) 2 or MPEG 1 standard. The digital audio signal is converted into a digital audio signal compressed by using a fixed bit rate or a linear PCM (Pulse Code Modulation) digital audio signal based on the MPEG or AC (Audio Compression)-3 standard.

When a sub-video signal is input from the A/V input portion 20 (e.g., a signal or the like from a DVD video player with an independent output terminal for a sub-video signal) or when a DVD video signal having such a structure is broadcast and received by the TV tuner portion 21, the sub-video signal in the DVD video signal is encoded (run-length-encoded) by the sub-video encoder, which results in a sub-video bitmap.

The encoded digital video signal, digital audio signal and sub-video data are packed by the formatter 19, resulting in a video pack, an audio pack and a sub-video pack. Further, they are collected and converted into a format defined by a DVD-recording standard [standard to record on, e.g., a DVD-RAM, a DVD-R (Recordable), a DVD-RW (rewritable) and others].

Here, the data recording/reproducing apparatus depicted in FIG. 1 can supply information (packs of the video, the audio, the sub-video and others) formatted by the formatter 19 and created management information to the hard disk drive portion 13 or the disk drive portion 12 through the data processor portion 14, and record them on the hard disk 13a or the optical disk 11.

Furthermore, this data recording/reproducing apparatus can record information recorded on the hard disk 13a onto the optical disk 11 through the hard disk drive portion 13, the data processor portion 14 and the disk drive portion 12.

Moreover, this data recording/reproducing apparatus can record information recorded on the optical disk 11 onto the hard disk 13a through the disk drive portion 12, the data processor portion 14 and the hard disk drive portion 13.

Additionally, it can perform editing processing, e.g., partially deleting video objects of a plurality of programs recorded on the hard disk 13a or the optical disk 11, connecting an object of a different program, and others. That is because the format described in connection with this embodiment defines a data unit to be processed and facilitates edition.

The microcomputer block 17 includes an MPU (Micro Processing Unit) or a CPU (Central Processing Unit), a ROM (Read Only Memory) in which a control program and others are written, and a RAM used to provide a work area required to execute a program.

The MPU in the microcomputer block 17 executes defect position detection, unrecorded area detection, recording information recording position setting, UDF (Universal Disk Format) recording, AV address setting and others by using the RAM as a work area based on the control program stored in the ROM.

Further, the microcomputer block 17 has an information processing portion required to control the entire system, and includes a work RAM, a directory detection portion, a VMG (entire video management information) information creation portion, a copy relevant information detection portion, a copy and scrambling information processing portion (RDI processing portion), a packet header processing portion, a sequence header processing portion, an aspect ratio information processing portion and others.

Of execution results by the MPU, content which should be informed to a user is displayed in a display portion 24 of the data recording/reproducing apparatus, or it is OSD(On Screen Display)-displayed in a monitor display 25. Furthermore, the microcomputer block 17 has a key input portion 26 which gives an operation signal used to operate this apparatus.

It is to be noted that a timing with which the microcomputer block 17 controls the disk drive portion 12, the hard disk drive portion 13, the data processor portion 14, the encoder portion 15, the decoder portion 16 and the like can be stipulated based on time data from an STC (System Time Clock) 27. Although a recording or reproducing operation is usually executed in synchronization with a time clock from the STC 27, any other processing may be executed with a timing independent from the time clock from the STC 27.

The decoder portion 16 has a separator which separates and takes out each pack from the DVD format signal having a pack structure, a memory which is used at the time of pack separation and execution of any other signal processing, a V decoder which decodes main video data (content of a video pack) separated by the separator, an SP (Sub Picture)

decoder which decodes sub-video data (content of a sub-video pack) separated by the separator, and an A (Audio) decoder which decodes audio data (content of an audio pack) separated by the separator. Moreover, it also includes a video processor which appropriately combines a decoded sub-video with a decoded main video, superimposes a menu, a highlight button, a subtitle and any other video on the main video and outputs a result.

An output video signal from the decoder portion 16 is input to the V mixing portion 22. In the V mixing portion 22, combination of text data is performed. Additionally, to the V mixing portion 22 is also connected to a line which directly fetches a signal from the TV tuner portion 21 or the A/V input portion 20.

To the V mixing portion 22 is connected a frame memory portion 28 used as a buffer. When an output from the V mixing portion 22 is an analog output, it is output to the outside through an I/F (Interface) 29. When the same is a digital output, it is output to the external monitor display 25 through a digital/analog converter 30.

An output audio signal from the decoder portion 16 is analog-converted by the digital/analog converter 31 through a selector 23, and output to an external speaker 32. The selector 23 is controlled by a select signal from the microcomputer block 17. As a result, the selector 23 can directly select a signal transmitted through the encoder portion 15 when directly monitoring the digital signal from the TV tuner portion 21 or the A/V input portion 20.

It is to be noted that the formatter 19 of the encoder portion 15 creates each cut information during recording, and periodically supplies it to the MPU of the microcomputer block 17 [information at the time of, e.g., GOP (Group of Picture) top interruption and the like] As the cut information, there are a pack number of a VOBU (Video Object Unit), an end address of an I (Intra) picture from the top of the VOBU, a reproduction time of the VOBU and others.

At the same time, information from the aspect ratio information processing portion is supplied to the MPU when starting recording, and the MPU creates VOB (Video Object) stream information STI. Here, the STI saves resolution data, aspect data and others, and each decoder portion performs initial setting based on this information during reproduction.

Additionally, this data recording/reproducing apparatus determines a video file as one file in one disk. Further, when data is accessed (sought), a minimum continuous information unit (size) is determined in order to continue reproduction without interruption. This unit is referred to as a CDA (Contiguous Data Area). A CDA size is a multiple number of an ECC (error correction code) block (16 sectors), and recording is performed in this CDA unit in the file system.

The data processor portion 14 receives data in the VOBU unit from the formatter 19 of the encoder portion 15, and supplies the data in the CDA unit to the disk drive portion 12 or the hard disk drive portion 13. Further, the MPU of the microcomputer block 17 creates management information required to reproduce recorded data, and supplies the created management information to the data processor portion 14 upon recognizing a data recording end command. As a result, the management information is recorded on the optical disk 11.

Therefore, when encoding is carried out, the MPU of the microcomputer block 17 receives information in data units (cut information and the like) from the encoder portion 15. Furthermore, the MPU of the microcomputer block 17 recognizes the management information (file system) read from the optical disk 11 and the hard disk 13a when starting recording, recognizes an unrecorded area in each disk, and sets a recording area on the data is set to the disk through the data processor portion 14.

Figure 2:
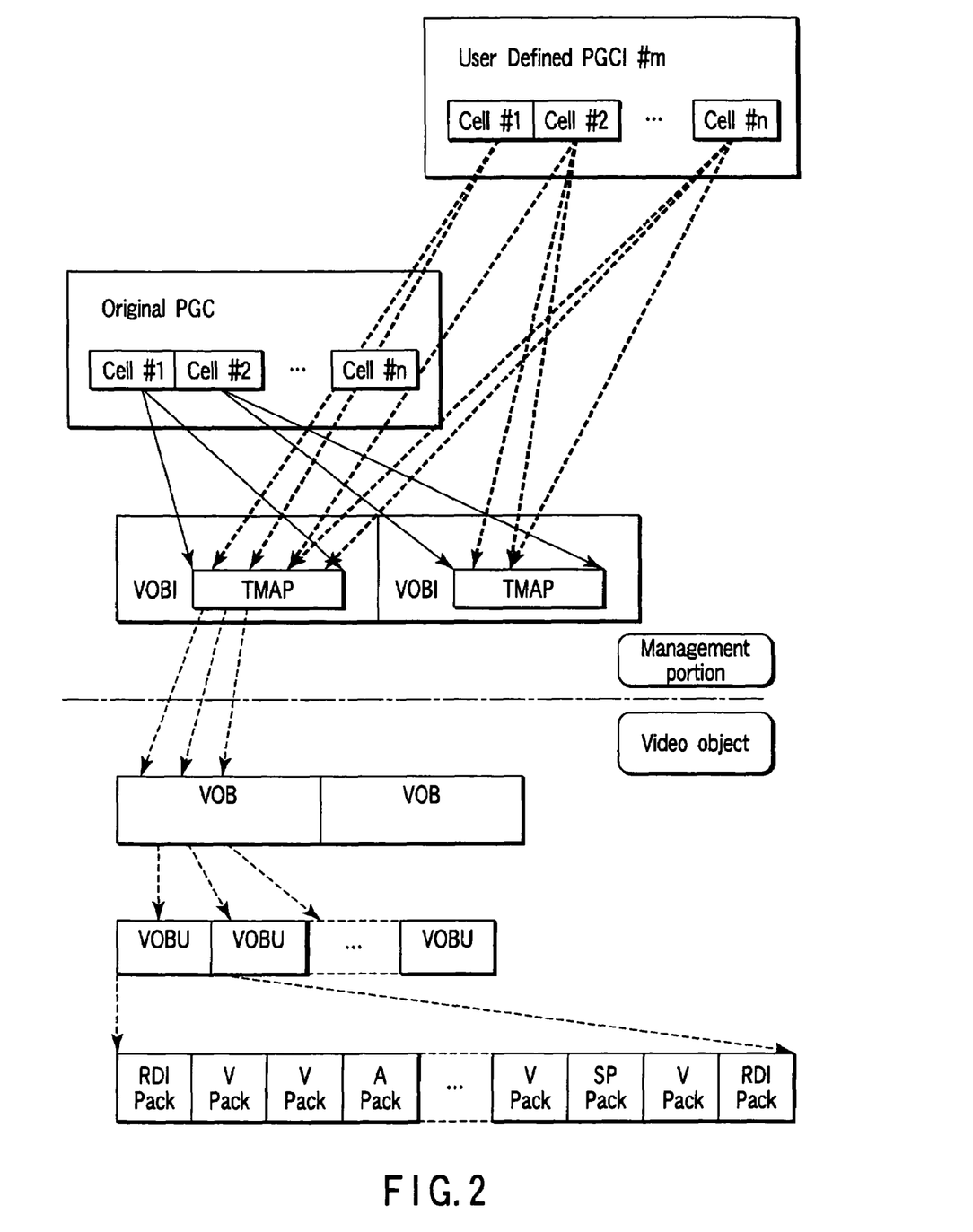
FIG. 2 is a view illustrating a relationship between management information of a real time DVD and a video object as a content in the same embodiment.

Referring to FIG. 2, a relationship between the management information of the real time DVD and the video object as a content will now be briefly described.

In FIG. 2, first, the video object VOB will be explained. This VOB is referred to as a VR_MOVIE.VRO file in a directory. The video file has a hierarchical structure, one file is constituted by one or a plurality of VOBs, one VOB is constituted by one or a plurality of video object units VOBUs, and one VOBU is constituted by a plurality of packs. As a plurality of the packs, there are an RDI pack, a V (video) pack, an A (audio) pack, an SP (sub-video) pack and others.

The RDI pack is referred to as a unit control information pack, a navigation information pack or a real time data information pack RDI_PCK. This pack includes information indicative of a start time at which a first field of the VOBU to which this back belongs is reproduced, information indicative of a recording time of the VOBU, manufacturer information MNFI and others. Moreover, it also includes display control information DCI and copy control information CCI. This display control information indicates aspect ratio information, subtitle mode information, and film camera mode information. The copy control information includes copy permission information or copy inhibition (non-permission) information.

The V pack is obtained by compressing the video data based on the MPEG 2 mode, and it is constituted by a pack header, a packet header and a video data portion. The A pack is obtained by processing the audio data based on the mode of, e.g., linear PCM, MPEG or AC-3, and it is constituted by a pack header, a packet header and an audio data portion.

The management information is referred to as a video manager VMG, and a program chain PGC which manages a data reproduction order is defined in this information. In this program chain PGC, a cell is defined. The cell is linked with video object information VOBI which is information concerning the video object VOB as a reproduction target.

A part in which concrete information of the PGC is recorded is program chain information PGCI. There are two types of PGCI, and one is an original PGCI (ORG_PGCI) and the other is user defined program chain information (UD_PGCI).

Usually, in recording, the original PGC is created. The user defined PGCI does not have its own video object and, as shown in FIG. 2, it is created as a play list by editing (deleting, adding) a user defined cell UD_Cell linked with the video object information VOBI of the original PGC.

A time map TMAP is described in the VOBI, and this TMAP specifies the VOBU constituting the VOB corresponding to the VOBI. Linking from the cell to the VOBI is specified by a logic address. Additionally, linking from the TMAP information to the VOB and the VOBU is carried out based on a stream number of the VOB, the number of VOBUs in this VOB, an entry number relative to each VOBU, and a logic address to each target VOBU.

A hierarchy of the program chain information PGCI in the management information will now be described. As described above, as the program chain information, there are two types, i.e., the original program chain information ORG_PGCI and a user defined program chain information table UD_PGCIT.

The ORG_PGCI is management information which is automatically created when the original program is recorded by the data recording/reproducing apparatus, and one type of this information exists in one disk. On the contrary, the UD_PGCI is management information as a play list created by arbitrarily specifying some of a plurality of recorded original programs by a user and setting their reproduction order. Therefore, a plurality of the UD_PGCIs can be set.

Figure 3:
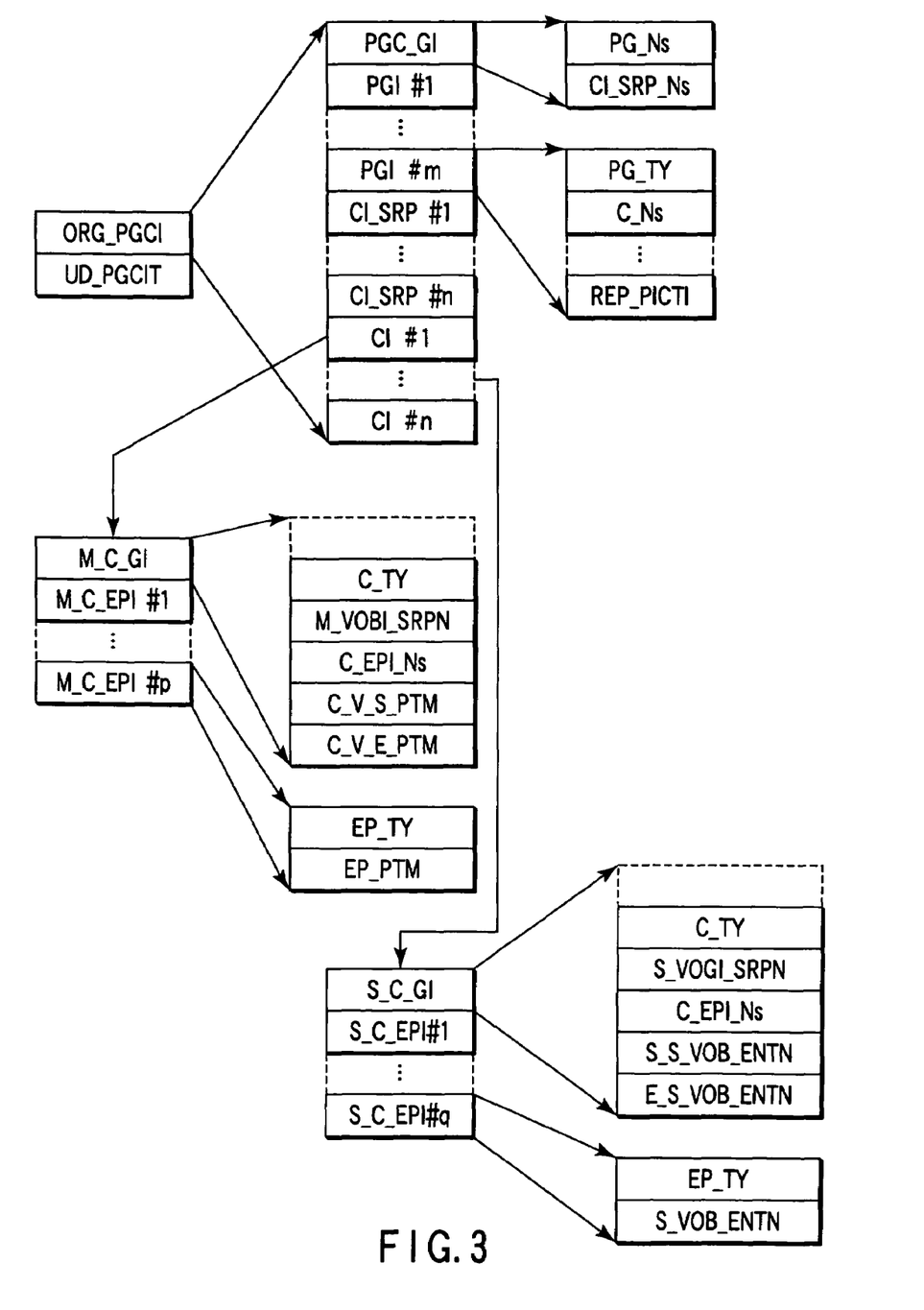
FIG. 3 is a view illustrating a hierarchical structure of original program chain information in the same embodiment.

FIG. 3 shows a hierarchical structure of the original program chain information ORG_PGCI. The original program chain information ORG_PGCI includes program chain general information PGC_GI, program information PGI, a cell information search pointer CI_SRP, and cell information CI.

In the PGC_GI are described the program number PG_Ns indicating how many programs to be reproduced by the program chain exist, and a cell search pointer number CI_SRP_Ns indicating how many cell search pointers exist. In the example of FIG. 3, program information PGI #1 to PGI #m exist, and each one PGI corresponds to a program as an original title. Further, the cell search pointers CI_SRP #1 to CI_SRP #n exist.

The program information PGI includes a program type PG_TY, a cell number C_Ns of this program, and representative picture information REP_PICTI of this program. In the representative picture information REP_PICTI are described a cell number of a representative picture and a picture point in this cell.

The cell search pointer CI_SRP indicates a descriptive address of corresponding cell information CI. A description content of the cell information CI will be explained in case of a movie cell and in case of a still cell.

First, in case of a movie cell, the cell information includes movie cell general information M_C_GI and movie cell entry information M_C_EPI. In the movie cell general information M_C_GI are described a cell type C_TY indicating whether a cell is a movie type or a still type, M_VOBI_SRPN used to indicate a VOB specified by this cell, and a cell entry point information number C_EPI_Ns indicating how many cell entry points exist.

Furthermore, C_V_S_PTM indicative of a time at which a video corresponding to this cell starts and C_V_E_PTM indicative of an end time are also described. Moreover, as the movie cell entry point information M_C_EPI, an entry point type EP_TY and an entry point presentation time EP_PTM are described.

In case of a still cell, a described content is substantially the same as that of the movie cell. In case of the still cell, however, since a VOB group VOG including at least one VOB and the cell are linked with each other, the still cell is expressed as S_VOGI_SRPN. Moreover, in place of the presentation time PTM, S_S_VOB_ENTN indicative of a start VOB number of a VOB group VOG corresponding to this still cell and E_S_VOB_ENTN indicative of an end VOB number are described. In the still cell entry point information S_C_EPI, a still VOB entry number S_VOB_ENTN is likewise described in place of PMT.

According to this, in the description of the program representative picture information REP_PICTI, when the movie cell is specified as a cell in which a representative picture exists, the PTM is described as a picture point in the cell. When the still cell is specified, the still VOB entry number S_VOB_ENTN is described as a picture point in the cell.

Figure 4:
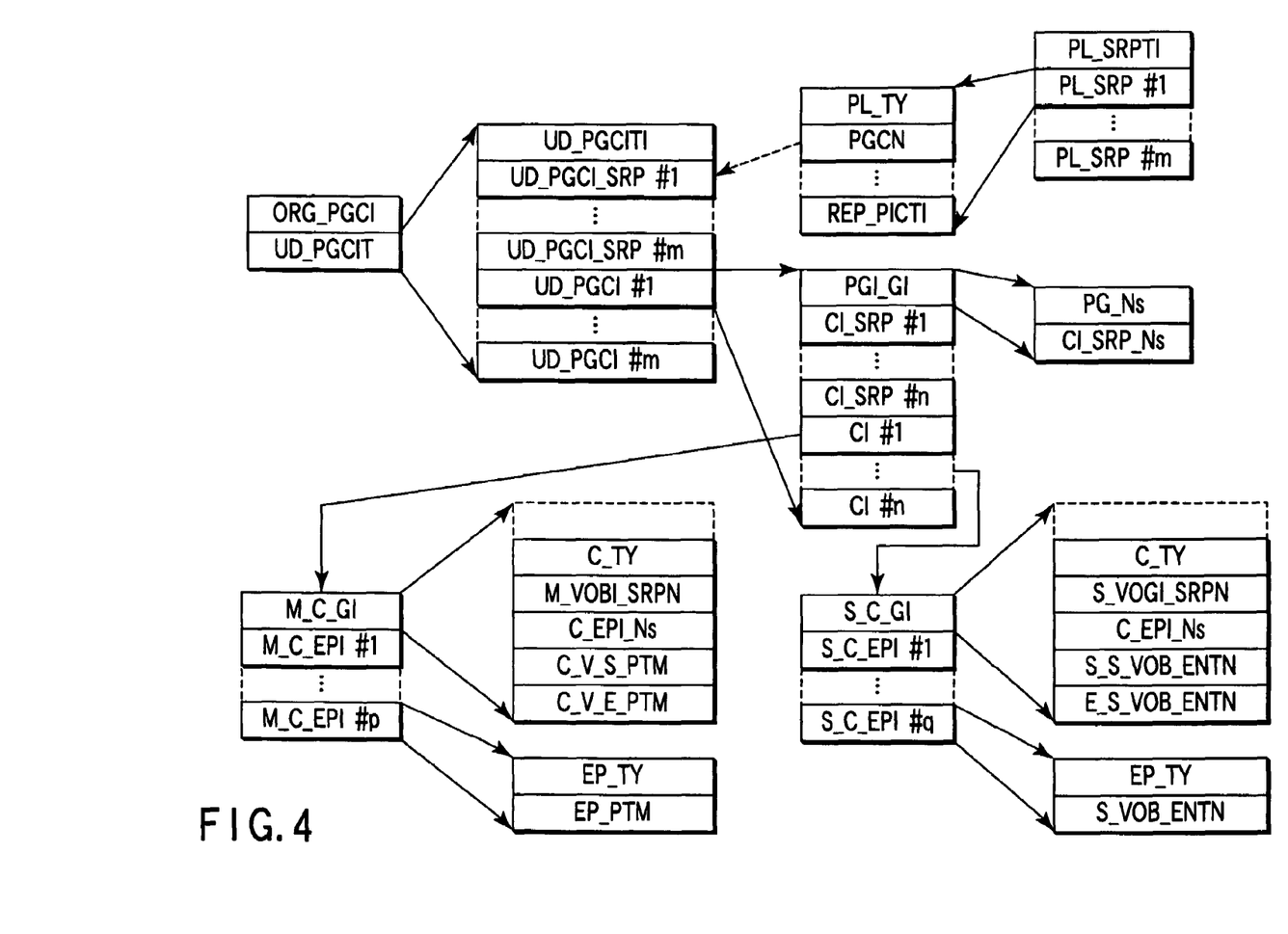
FIG. 4 is a view illustrating a hierarchical structure of a user defined program information table in the same embodiment.

FIG. 4 shows a hierarchical structure of the user defined program chain information table UD_PGCIT. The user defined program chain information table UD_PGCIT includes user defined program chain information table information UD_PGCJTI, a user defined program chain information search pointer UD_PGCI_SRP, and user defined program chain information UD_PGCI.

In the UD_PGCITI is described a search pointer number (which will be abbreviated as UD_PGCI_SRP_Ns although not shown in FIG. 4) indicating how many user defined program chain information search pointers exist.

The user defined program chain information search pointer UD_PGCI_SRP indicates a descriptive address of corresponding user defined program chain information UD_PGCI. In the example depicted in FIG. 4, the user defined program chain information UD_PGCI #1 to UD_PGCI #m exist.

It is to be noted that play list information is described at a position different from that of the program chain information in a video manager VMG which is management information. In each play list information, a number PGCN of the user defined program chain information search pointer UD_PGCI_SRP linked with the play list is described. Therefore, as to the program chain information, each UD_PGCI corresponds to the play list.

A format of this user defined program chain information UD_PGCI is substantially the same as that of the original program chain information ORG_PGCI mentioned above in conjunction with FIG. 3. However, since the UD_PGCI is constituted by combining an arbitrary part of the original program, the above-described program information PGI does not exist in the UD_PGCI.

Therefore, a play list type PL_TY and a representative picture information REP_PICTI of the play list are described in the play list information which is described at a position different from that of the above-described program chain information. In this embodiment, therefore, this play list type and the representative picture information of the play list are used. Since the cell information has the same format as the ORG_PGCI, its explanation will be eliminated here.

Figure 5A:
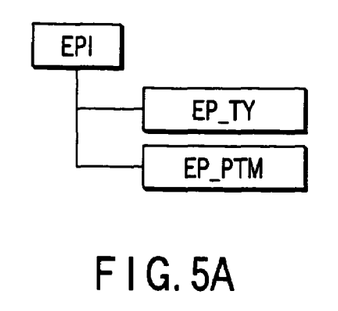
FIGS. 5A and 5B are views respectively illustrating a structure of entry point information based on a DVD-VR standard in the same embodiment.
Figure 5B:
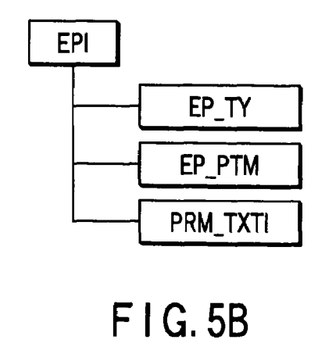

FIGS. 5A and 5B respectively show entry point information based on a DVD-VR (Video Recorder) standard. As the entry point information, there are two types, i.e., a Type A shown in FIG. 5A and a Type B depicted in FIG. 5B. An entry point of the Type A is constituted by EP_TY indicative of a type of the entry point and EP_PTM in which a PTM indicated by the entry point is recorded.

Besides the entry point of the Type B, primary text information PRM_TXTI exists. The PRM_TXTI is defined by 128 bytes, and constituted by 64 bytes of a first field and 64 bytes of a second field. An ASCII (American Standard Code for Information Interchange) code must be set in the first field, and a character set specified in the VMGI_MAT must be used to carry out description in the second field.

Figure 6:
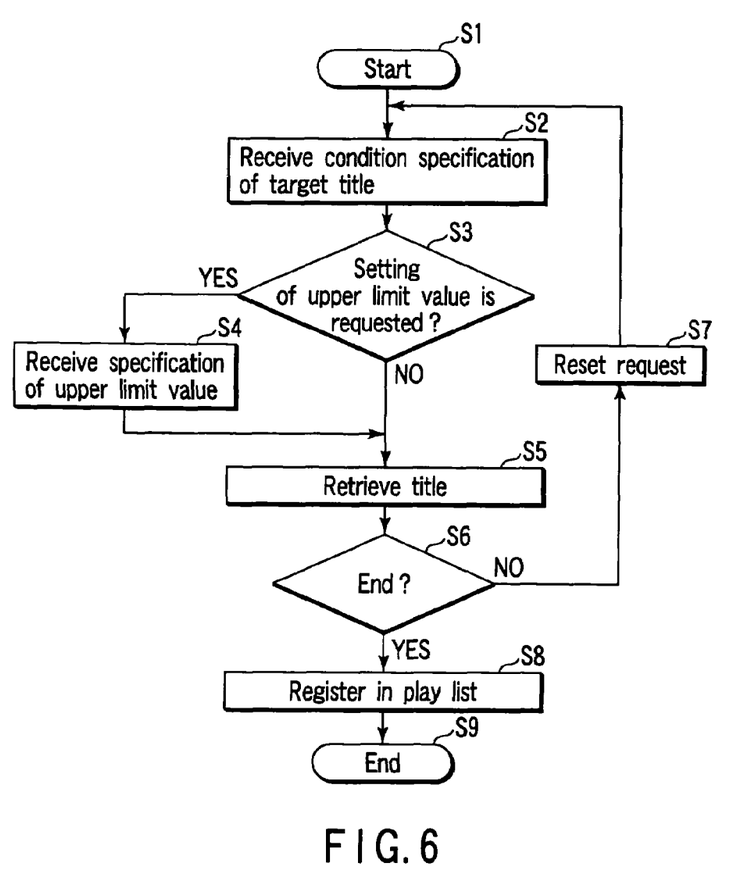
FIG. 6 is a flowchart illustrating a play list editing operation in the same embodiment.

Here, FIG. 6 shows a flowchart summing up a play list editing operation. First, when started (step S1), the microcomputer block 17 receives from a user a condition specification of a title as a target to be recorded in a play list among a plurality of titles recorded on the optical disk 11 or the hard disk 13a at a step S2.

Then, the microcomputer block 17 judges whether setting of an upper limit value of registration number of the titles to be registered in the play list under the above-described condition is requested at a step S3, and receives a specification of the upper limit value from a user at a step S4 when it is determined that setting is requested (YES).

Subsequently, after the step S4, or when it is determined that setting of the upper limit value is not requested (NO) at the step S3, the microcomputer block 17 retrieves all the titles satisfying the above-described condition from a plurality of the titles recorded on the optical disk 11 or the hard disk 13a at a step S5.

Thereafter, the microcomputer block 17 judges whether end of processing is requested at a step S6. When it is determined that end of processing is not requested (NO) and resetting is requested at a step S7, this block is shifted to processing at a step S2.

Furthermore, when it is determined that end of processing is requested (YES) at the step S6, the microcomputer block 17 registers the retrieved titles in the play list so as not to exceed the upper limit value if the upper limit value is set at the step S8, and terminates the processing (step S9).

Here, as to the conditions of the titles to be registered in the play list, for example, when a date and time at which the titles are recorded, a day, recording start time, a reception channel and others are appropriately set, a title (e.g., a serial drama) recorded at the same time every week is automatically selected as a title to be registered in the play list, thereby facilitating the play list editing operation.

Moreover, when a title name of a program can be directly obtained, this title name can be determined as a condition for selection. As the title name of a program, there is used program information obtained from EPG (Electronic Program Guide), title information input to the apparatus by a user, a title information included in XDS and teletext information, or the like.

Additionally, when there is a dedicated channel like CS (Communication Satellite) broadcasting, channel information may be set as a condition. According to this condition, titles received through the same channel can be retrieved. Further, information or the like obtained at the time of copying (e.g., from the DVD-RAM to the hard disk) from another medium can be determined as a condition. Furthermore, information arbitrarily set by a user can be set as a condition.

Figure 7A:
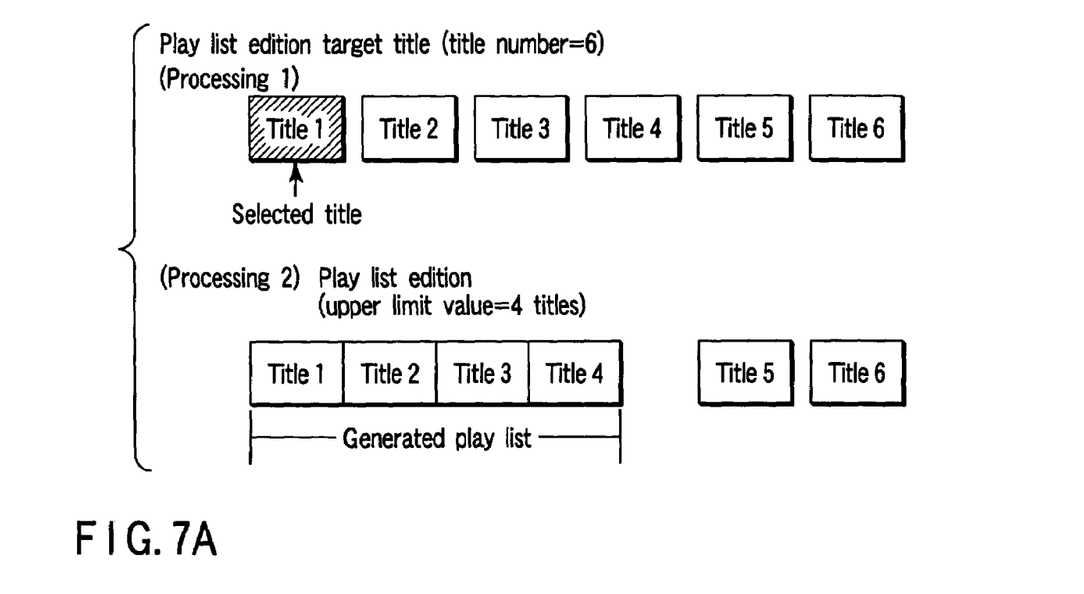
FIGS. 7A and 7B are views respectively illustrating a play list editing operation when an upper limit value is provided to the title number in the same embodiment.
Figure 7B:
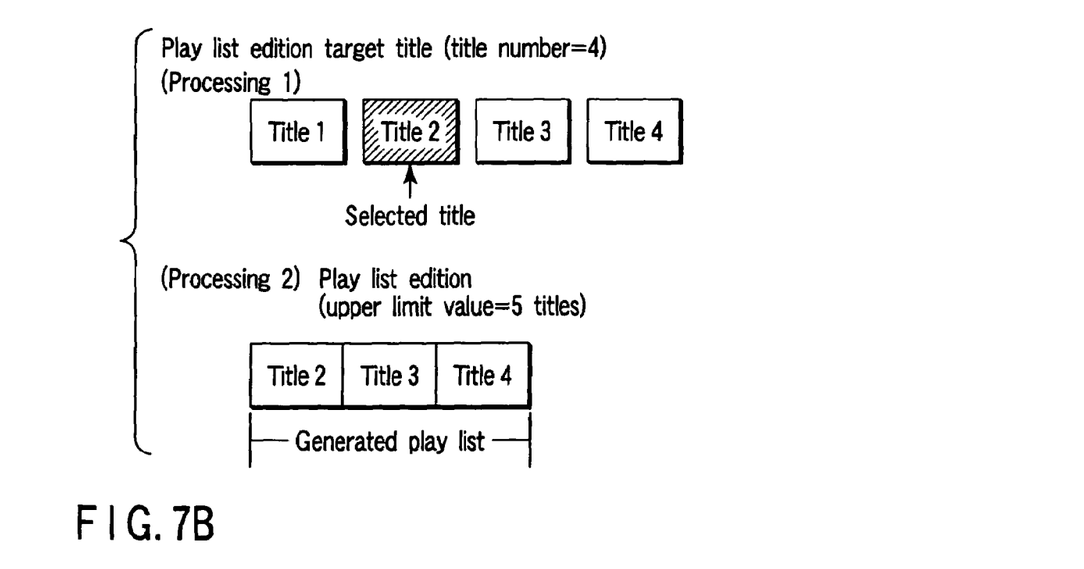

FIGS. 7A and 7B respectively illustrate the play list editing operation when an upper limit value is set to the number of titles to be registered as the play list. In FIG. 7A, it is assumed that six titles satisfying the condition are retrieved when an upper limit value "4" is set to the number of titles selected as a target of play list edition as indicated by processing 1.

Then, the microcomputer block 17 controls to register in the play list four titles 1 to 4 in the retrieved order (recorded order) with the title 1 which was first retrieved in terms of time (title first recorded in terms of time) being determined as a top as indicated by processing 2, and check off the other titles 5 and 6 from the play list target.

For example, since a serial program or the like recorded at the same time every week is changed every cours, setting the number of titles with which that program is recorded can prevent a program recorded in a next cours from being registered in the same play list.

Furthermore, in FIG. 7B, it is assumed that four titles satisfying the condition are retrieved when an upper limit value "5" is set to the number of titles selected as a target of play list edition as indicated by the processing 1. In this case, although the four retrieved titles 1 to 4 can be all registered in the play list, a user can select a title which is first reproduced at the time of reproduction.

In the processing 1 depicted in FIG. 7B, of the four retrieved titles 1 to 4, the title 2 which was retrieved at second in terms of time is selected as a title which is reproduced at first in play list reproduction.

In this case, as indicated by the processing 2, the microcomputer block 17 controls to register the three titles 2 to 4 in the play list in the retrieved order with the selected title 2 being determined as a top. That is, the title 1 is controlled so as not to be registered even if it satisfies the condition.

As described above, by enabling a user to arbitrary select a title which is reproduced at first in play list reproduction from a plurality of the retrieved titles, the play list can become further practical for the user.

It is to be noted that the present invention is not restricted to the foregoing embodiment, and constituent elements can be modified and embodied in many ways without departing from the scope of the invention on an embodying stage. Moreover, appropriately combining a plurality of constituent elements disclosed in the foregoing embodiment can form various kinds of inventions. For example, some constituent elements can be eliminated from all the constituent elements disclosed in the embodiment.

What is claimed is:

1. A data production apparatus comprising:
   a condition setting portion configured to set a condition used to select a title to be registered in a play list among a plurality of titles recorded on a recording medium;
   a retrieval portion configured to retrieve a title corresponding to a condition set by the condition setting portion by making reference to management information recorded on the storage medium;
   a registration portion configured to register a title retrieved by the retrieval portion in the play list; and
   an upper limit value setting portion configured to set an upper limit value of the number of titles to be registered in the play list,
   wherein the registration portion restricts the number of titles to be registered in the play list based on the upper limit value set by the upper limit setting portion, and
   wherein the registration portion selects titles retrieved by the retrieval portion in a recorded order and registers them in the play list, the number of which titles does not exceed the upper limit value.

2. A data reproduction apparatus according to claim 1, further comprising:
   a title setting portion configured to set a title which is reproduced at first in play list reproduction among titles retrieved by the retrieval portion,
   wherein the registration portion selects titles retrieved by the retrieval portion in a recorded order, the number of which titles does not exceed the upper limit, from titles set by the title setting portion, and registers them in the play list.

3. A data reproduction apparatus according to claim 1, wherein the condition setting portion can set a date and time at which a title is recorded on the recording medium as a condition used to select a title to be registered in the play list.

4. A data reproduction apparatus according to claim 1, wherein the condition setting portion can set a day on which a title is recorded on the recording medium as a condition used to select a title to be registered in the play list.

5. A data reproduction apparatus according to claim 1, wherein the condition setting portion can set a time at which a title is recorded on the recording medium as a condition used to select a title to be registered in the play list.

6. A data reproduction apparatus according to claim 1, wherein the condition setting portion can set a channel through which a title is broadcast as a condition used to select a title to be registered in the play list.

7. A data reproduction apparatus according to claim 1, wherein the condition setting portion can set a title name as a condition used to select a title to be registered in the play list.

8. A data reproduction apparatus according to claim 1, wherein the condition setting portion can set arbitrary information for each title as a condition used to select a title to be registered in the play list.

9. A data reproduction method comprising:
setting a condition used to select titles to be registered in a play list among a plurality of titles recorded on a recording medium;
retrieving titles corresponding to a set condition by making reference to management information recorded on the recording medium;
registering retrieved titles in the play list; and
setting an upper limit value of the number of titles to be registered in the play list,
wherein the number of titles to be registered in the play list is restricted based on the set upper limit value, and
wherein the number of retrieved titles which does not exceed the upper limit value are selected in a recorded order and registered in the play list.

10. A data reproduction method according to claim 9, further comprising:
setting a title which is reproduced at first in play list reproduction among retrieved titles,
wherein the number of retrieved titles which does not exceed the upper limit value are selected in a recorded order from set titles and registered in the play list.

* * * * *